No. 727,920. PATENTED MAY 12, 1903.
W. ELLIS.
WAGON BOX AND END GATE.
APPLICATION FILED MAR. 2, 1903.
NO MODEL. 2 SHEETS—SHEET 1.

Witnesses
E. G. McKee
N. Reynolds

Inventor
William Ellis
By Rexford M. Smith
Attorney

THE NORRIS PETERS CO., PHOTO-LITHO., WASHINGTON, D. C.

No. 727,920. PATENTED MAY 12, 1903.
W. ELLIS.
WAGON BOX AND END GATE.
APPLICATION FILED MAR. 2, 1903.
NO MODEL. 2 SHEETS—SHEET 2.
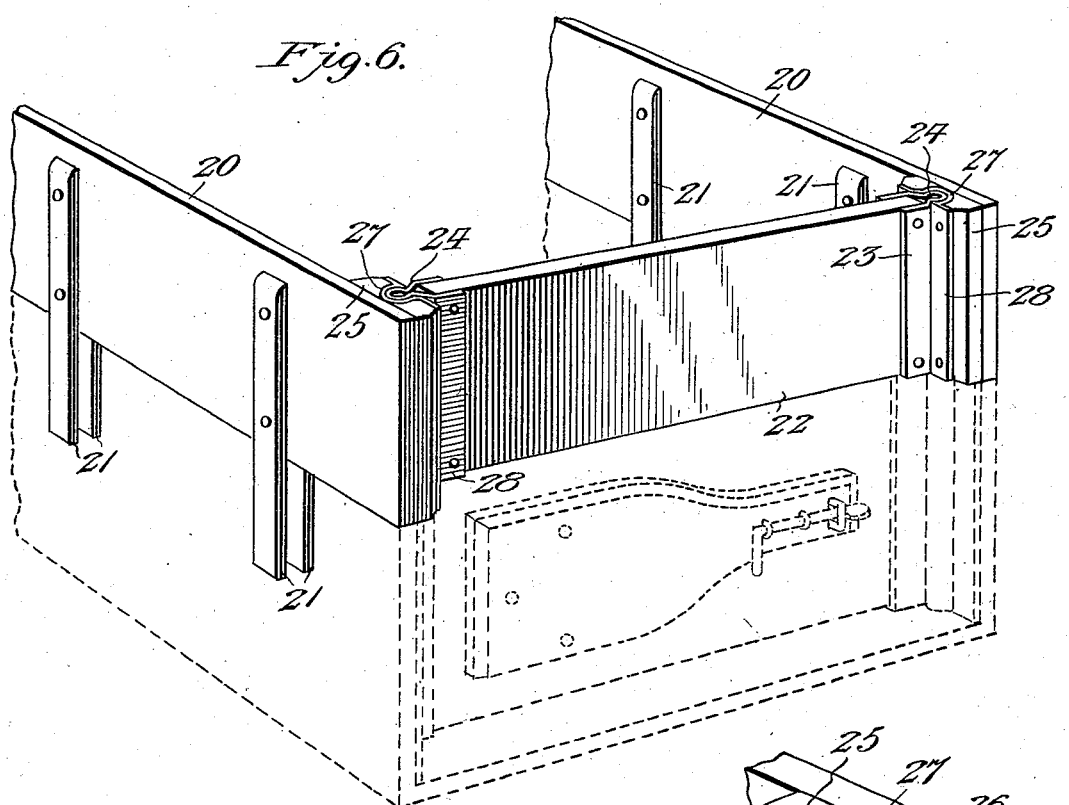
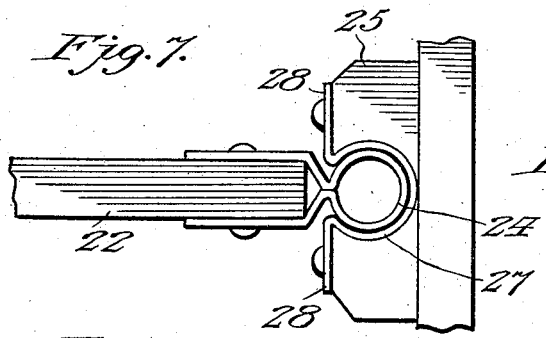
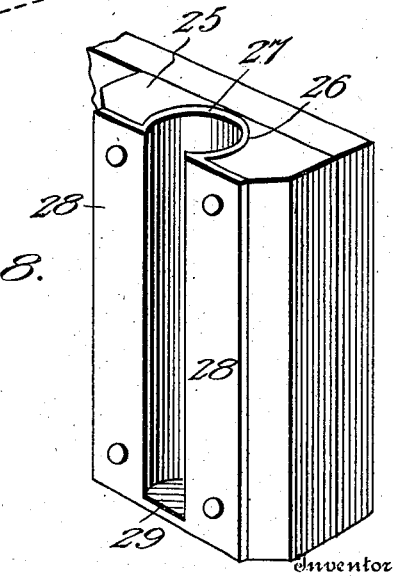
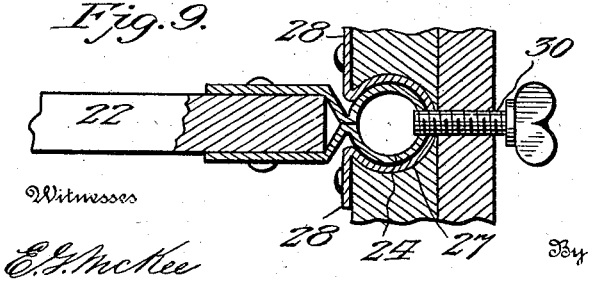
Witnesses
E. G. McKee
N. Reynolds
Inventor
William Ellis
By Rexford M. Smith
Attorney No. 727,920. Patented May 12, 1903.

UNITED STATES PATENT OFFICE.

WILLIAM ELLIS, OF BLOCKTON, IOWA, ASSIGNOR OF ONE-HALF TO NIMAN T. MATTINGLY, OF MONTOUR, IOWA.

WAGON-BOX AND END-GATE.

SPECIFICATION forming part of Letters Patent No. 727,920, dated May 12, 1903.

Application filed March 2, 1903. Serial No. 145,808. (No model.)

*To all whom it may concern:*

Be it known that I, WILLIAM ELLIS, a citizen of the United States, residing at Blockton, in the county of Taylor and State of Iowa, have invented a certain new and useful Wagon-Box and End-Gate, of which the following is a specification, reference being had therein to the accompanying drawings.

This invention relates to wagon-boxes and end-gates therefor, the object of the invention being to provide a wagon-box and end-gate so constructed and combined as to provide for quickly inserting and removing the end-gate and securely fastening the ends of the gate to the side-boards of the wagon-box, whereby the wagon-box is prevented from spreading under the expansive influence of the load contained therein.

A further object of the invention is to so combine the interlocking cleats and guides of the gate fastening or holding devices as to maintain a close, snug-fitting, and self-adjusting joint between the cleats and guides which will prevent material from finding its way between the members of the gate holding or fastening devices and also avoid rattling of the end-gate when in position.

A further object of the invention is to provide in connection with the wagon-box proper extension-boards and an end-gate therefor adapted to be superimposed upon the wagon-box proper, the end-gate being detachably fastened to the side-boards in such manner that said gate will be maintained in proper position and prevented from sliding or moving downward when the lower or main end-gate of the wagon-box is removed.

With the above and other objects in view the invention consists in the novel construction, combination, and arrangement of parts, as hereinafter fully described, illustrated, and claimed.

Figure 1:
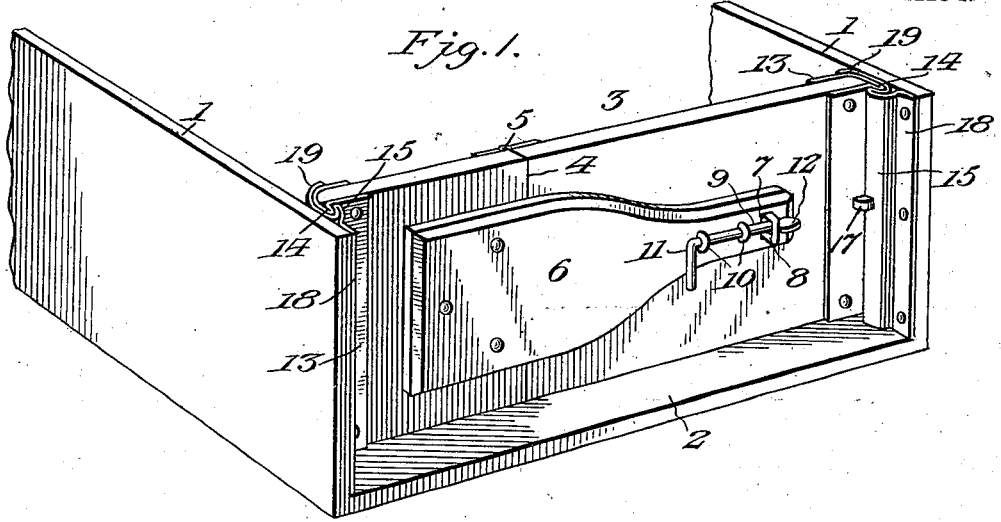
Figure 2:
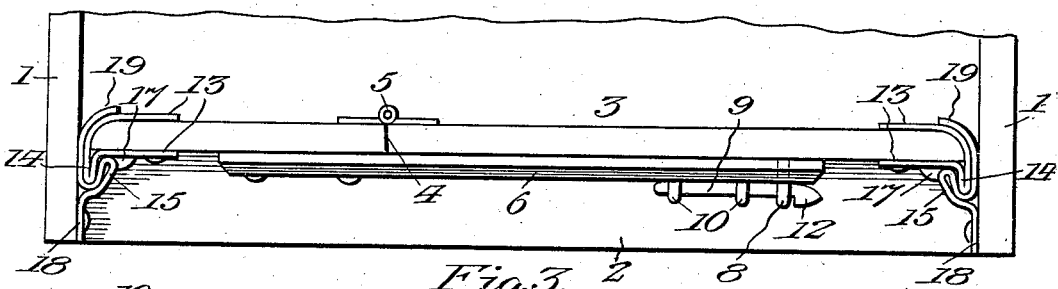
Figure 3:
Figures 4, 5:
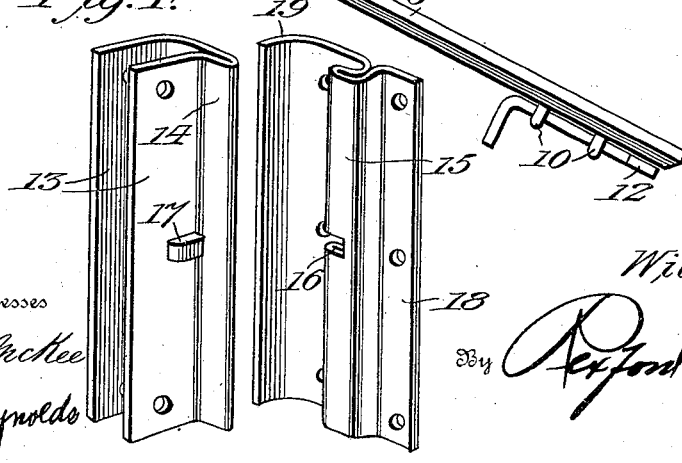

In the accompanying drawings, Figure 1 is a perspective view of a sufficient portion of a wagon-box to illustrate the application of the present improvements thereto and to the end-gate, which is also shown in operative position in said figure. Fig. 2 is an enlarged plan view of the same. Fig. 3 is a similar view showing the manner of opening and attaching the end-gate. Fig. 4 represents enlarged detail perspective views of the slide and cleat or guide. Fig. 5 is an enlarged detail section through the members of the end-gate-fastening device, said view being taken in line with the interlocking lug and notch. Fig. 6 is a perspective view of the extension-boards and supplemental end-gate, illustrating the wagon-box and its end-gate in dotted lines. Fig. 7 is a detail plan view illustrating the connection between the extension-boards and end-gate. Fig. 8 is an enlarged detail perspective view of the two-part cleat on one of the extension-boards. Fig. 9 is a detail horizontal section taken in line with the thumb-screw which holds the supplemental end-gate in place.

Like reference-numerals designate corresponding parts in all the figures of the drawings.

Referring to Fig. 1, 1 designates the side-boards, and 2 the bottom, of an ordinary rectangular wagon-box, while 3 represents the end-gate or tail-gate of the wagon-box, which is made in sections of unequal size jointed together on the line 4, the sections being suitably hinged together, as shown at 5. Connected with the shorter or smaller section is an extension board or lever, the projecting end of which is provided with an opening 7, adapted to fit over a staple or eye 8 on the other or larger section of the end-gate, the staple or eye 8 being designed to receive a locking-bolt 9, which is movable horizontally and longitudinally through suitable guides 10 and provided at one end with an operating crank-handle 11 and at its opposite end with a flat head 12, which projects at right angles to the handle 11, the arrangement being such that when the handle 11 hangs downward, as shown in Fig. 1, the head 12 cannot be withdrawn from the staple 8. By rocking the handle 11 upward to a horizontal position, however, the bolt may be slid lengthwise, so as to withdraw the head 12 from the staple 8, and thereby disengage the lever 6. This enables the lever to be moved outward, as shown in Fig. 3, thereby breaking the end-gate and permitting the extremities thereof to be disengaged from the sides of the wagon-box.

Fixed upon each end of the gate 3 is what I term a "slide," which is bent up out of sheet metal to comprise the oppositely-arranged parallel portions or flanges 13, which embrace the end of the gate and are bolted, riveted, or otherwise firmly secured thereto. At the extreme edge of the gate the sheet-metal blank from which the slide is formed is bent or folded and recurved to form a hook-shaped end portion 14, which is received behind a similar hook-shaped portion of the cleat, guide, or keeper, hereinafter described. The hooked portions 14 of the slides project rearwardly, or, in other words, toward the end of the wagon-box, as shown.

Secured to the inner surfaces of the sides 1 of the wagon-box are cleats, guides, or keepers, each of which is bent up from a piece of sheet metal. The central portion of said blank or piece or sheet metal is folded and also bent over in the shape of a hook, as shown at 15, while the bight or fold forming the extreme edge portion of the hook 15 is cut away to form a notch 16 for the reception of a lug or key 17, formed on or projecting from the adjacent slide, as best shown in Figs. 4 and 5. The lug or key 17 is arranged under the hook or upon the inner side thereof and about midway between the ends of the slide and is adapted to be received in a notch 16 of the cleat when the gate is closed, as shown in the drawings and as best illustrated in Fig. 5. One edge portion of the cleat is extended laterally to form an attaching-flange 18, while the opposite edge portion, which is of greater length, is extended in the opposite direction and bent or curved to form a spring flange or guard 19, which when the gate is closed bears with a yielding pressure against the rear side and corner of the gate, coming in direct and close contact with the rear portion of the slide, so as to prevent material from getting between the two parts of the fastening device and at the same time preventing any possibility of the end-gate rattling and working loose. The cleats may be bolted, riveted, or otherwise fastened to the side-boards of the wagon-box in the manner shown.

Extension side-boards 20 are provided at intervals with sets of pendent stanchions or keepers 21, which straddle the side-boards of the wagon-box, as shown in Fig. 6, and hold the extension-boards in place on the upper edges thereof. In connection with the extension side-boards 20 I employ a supplemental or extension end-gate 22, which is provided at its opposite ends with slides 23, each bent up from sheet metal, the central or projecting portion of which is bent into substantially circular or cylindrical shape to form a light tubular head 24. To each of the boards 20 is connected a two-part cleat or keeper consisting of a base portion 25, provided with a circular or cylindrical recess 26, in which is snugly fitted the hollow cylindrical body or central portion 27 of the other member of the cleat, which latter member is bent up out of sheet metal and provided with oppositely-extending edge portions 28, forming flanges, which are bolted, riveted, or otherwise secured to the part 25 and also to the extension side-boards 20. The tubular heads 24 at the opposite ends of the gate 22 are adapted to slide vertically from the top downward within the cylindrical portions 27 of the cleats, and the downward movement of the gate 22 is limited by the lower ends of said tubular heads 24 coming in contact with the bottom walls 29 of the cleats, the said lower ends of the cleats being closed, as shown in Fig. 8. By this means the supplemental or extension end-gate is upheld independently of the lower or main end-gate of the wagon-box proper. In order to lock the extension end-gate 22 in place, screws 30 are inserted through the extension-boards 20 and cleats into openings provided therefor in the tubular heads 24, as shown in Fig. 1.

The improvement hereinabove described obviates the necessity of employing stay bolts or rods to prevent the spreading of the sides of the wagon-box. The gate serves to brace the sides of the wagon-box and prevent the same from spreading, and the particular means for accomplishing this end does not interfere with the ready and quick removal of the end-gate whenever necessary. In addition to this close joints are effected between the end-gate and the sides of the wagon-box, and the end-gate is held in such manner as to prevent the same from rattling and working loose.

Having thus described the invention, what I claim as new, and desire to secure by Letters Patent, is—

1. The combination with a wagon-box, and an end-gate therefor, of hook-shaped slides fixed on the ends of the gate and slide-receiving cleats on the wagon-box, each cleat being bent up out of sheet metal and comprising a hook or bight portion behind which the hooked portion of the slide is received, one edge of the cleat forming an attaching-flange and the other edge being extended away from the wagon-box to embrace the slide and form a spring flange or guard therefor.

2. The combination with a wagon-box, and an end-gate therefor, of hook-shaped slides fixed on the ends of the gate and each provided with a lug or key located behind the hook or upon the inner side thereof, and slide-receiving cleats on the wagon-box, each cleat being bent up out of sheet metal and comprising a hook or bight portion behind which the hook portion of the slide is received, one edge of the cleat forming an attaching-flange and the other edge being extended away from the wagon-box to embrace the slide and form a spring flange or guard therefor, the cleat being notched to receive the lug or key on the slide.

3. The combination with a wagon-box, and an end-gate therefor, of hook-shaped slides fixed on the ends of the gate and each provided upon the inner side of the hook with a lug or key, and slide-receiving cleats on the wagon-box each cleat being bent up out of sheet metal and comprising a hook or bight portion behind which the hook portion of the slide is received, one edge of the cleat forming an attaching-flange and the other edge being extended away from the wagon-box to embrace the slide and form a spring flange or guard therefor, the bight of the cleat being cut away to form a notch for the reception of the lug or key on the slide.

4. The combination with a wagon-box, and a removable end-gate, of extension-boards, a supplemental or extension end-gate, slides on the ends of said gate provided with cylindrical heads, cleats on the extension side-boards each comprising a recessed base and a sheet-metal member having a hollow cylindrical body portion which fits in the recessed base and is closed at its lower end and adapted to receive the tubular head at the adjacent end of the gate and uphold the extension-gate when the lower gate is removed, and means for locking the extension-gate in place and preventing the upward movement of the same.

In testimony whereof I affix my signature in presence of two witnesses.

WILLIAM ELLIS.

Witnesses:
JESSE F. ROSE,
J. M. WALTON.